(12) United States Patent
Zhang et al.

(10) Patent No.: US 8,736,658 B2
(45) Date of Patent: May 27, 2014

(54) IMAGE-BASED VIDEO CONFERENCE CONTROL METHOD, TERMINAL, AND SYSTEM

(75) Inventors: Jing Zhang, Shenzhen (CN); Feng Geng, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 294 days.

(21) Appl. No.: 13/270,461

(22) Filed: Oct. 11, 2011

(65) Prior Publication Data

US 2012/0038740 A1 Feb. 16, 2012

Related U.S. Application Data

(63) Continuation of application No. PCT/CN2010/071516, filed on Apr. 2, 2010.

(30) Foreign Application Priority Data

Apr. 8, 2009 (CN) .......................... 2009 1 0038505

(51) Int. Cl.
 *H04N 7/14* (2006.01)
(52) U.S. Cl.
 USPC .................................... 348/14.07; 348/14.09
(58) Field of Classification Search
 USPC ....................... 715/733; 375/240.21; 709/204
 See application file for complete search history.

(56) References Cited

U.S. PATENT DOCUMENTS

| | | | |
|---|---|---|---|
| 2001/0044826 A1 * | 11/2001 | Ludwig et al. ................ | 709/204 |
| 2003/0025786 A1 | 2/2003 | Norsworthy | |
| 2006/0098086 A1 | 5/2006 | Chandra et al. | |
| 2006/0215765 A1 * | 9/2006 | Hwang et al. ............ | 375/240.21 |
| 2006/0259552 A1 * | 11/2006 | Mock et al. .................... | 709/204 |
| 2008/0184124 A1 * | 7/2008 | Agarwal et al. ............... | 715/733 |

FOREIGN PATENT DOCUMENTS

| | | |
|---|---|---|
| CN | 1874483 | 12/2006 |
| CN | 101094381 | 12/2007 |
| CN | 201063755 | 5/2008 |
| CN | 101198008 | 6/2008 |

(Continued)

OTHER PUBLICATIONS

Extended European Search Report issued in corresponding European Patent Application No. 10761193.1, mailed Sep. 7, 2012.

(Continued)

*Primary Examiner* — Mohammad Islam
(74) *Attorney, Agent, or Firm* — Brinks Gilson & Lione

(57) ABSTRACT

Embodiments of the present invention disclose an image-based video conference control method, terminal, and system. The method includes the following steps: sending a control request message to a network-side device (101); dynamically displaying image information according to a control message fed back by the network-side device (102); and editing an image according to the image information to complete video conference control (103). Through the embodiments of the present invention, an image of a single or multiple conference site pictures can be directly selected for operation according to abundant information provided by each conference site picture in combination with an operation of a remote controller, so that all kinds of conference control operations in a video conference are implemented, and a need of entering a multi-level menu to carry out complicated video conference control is avoided.

16 Claims, 13 Drawing Sheets

(56) References Cited

FOREIGN PATENT DOCUMENTS

| | | |
|---|---|---|
| CN | 101252671 | 8/2008 |
| CN | 101257607 | 9/2008 |
| CN | 101350898 | 1/2009 |
| CN | 101534411 | 9/2009 |
| CN | 101583011 | 11/2009 |
| EP | 1381237 A2 | 1/2004 |
| WO | WO 2008135999 A1 | 11/2008 |
| WO | WO2010/022677 A1 | 3/2010 |
| WO | WO2010/115364 A1 | 10/2010 |
| WO | WO2010/135979 | 12/2010 |

OTHER PUBLICATIONS

Chinese Patent No. 101534411, issued on Dec. 12, 2012, granted in corresponding Chinese Patent Application No. 200910038505.6.
Second Chinese Office Action dated (mailed) Jan. 5, 2012, issued in related Chinese Application No. 200910038505.6 Huawei Technologies Co., LTD.
First Office Action of related Chinese Application No. 200910038505.6 dated Sep. 2, 2010.
International Search Report issued in related PCT/CN2010/071516 dated Jul. 1, 2010.
Written Opinion of the International Searching Authority issued in related PCT/CN2010/071516 dated Jul. 1, 2010.

* cited by examiner

| Conference site 1 | Conference site 2 | Conference site 3 | Conference site 4 |
| --- | --- | --- | --- |
| Conference site 5 | Conference site 6 | Conference site 7 | Conference site 8 |
| Conference site 9 | Conference site 1 not participating in the conference | Conference site 2 not participating in the conference | Voice conference site 1 |
| Voice conference site 2 | | | |

| Conference site 1 | Conference site 2 | Conference site 3 | Conference site 4 |
|---|---|---|---|
| Conference site 5 | Conference site 6 | Conference site 7 | Conference site 8 |
| Conference site 9 | Conference site 10 | Conference site 11 | Conference site 12 |
| Conference site 13 | Conference site 14 | Conference site 15 | Conference site 16 |

→ Press a DOWN direction key

| Conference site 5 | Conference site 6 | Conference site 7 | Conference site 8 |
|---|---|---|---|
| Conference site 9 | Conference site 10 | Conference site 11 | Conference site 12 |
| Conference site 13 | Conference site 14 | Conference site 15 | Conference site 16 |
| Conference site 17 | Conference site 18 | | |

↑ PAGE DOWN

| Conference site 17 | Conference site 18 | | |
|---|---|---|---|
| | | | |
| | | | |
| | | | ☐ |

FIG. 5

| Conference site 1 | Conference site 2 | Conference site 3 | Conference site 4 |
| --- | --- | --- | --- |
| Conference site 5 | Conference site 6 | | Conference site 8 |
| | Conference site 1 not participating in the conference | Conference site 2 not participating in the conference | Voice conference site 1 |
| Voice conference site 2 | | | |

FIG. 11

| Conference site 1 | Conference site 2 | Conference site 3 | Conference site 4 |
| --- | --- | --- | --- |
| Conference site 5 | Conference site 6 | Conference site 7 | Conference site 8 |
| Conference site 9 | Conference site 1 not participating in the conference | Conference site 2 not participating in the conference | Voice conference site 1 |
| Voice conference site 2 | | | |

FIG. 12

| Conference site 1 | Conference site 2 | Conference site 3 | Conference site 4 |
|---|---|---|---|
| Conference site 5 | Conference site 6 | Conference site 7 | Conference site 8 |
| Conference site 9 | Conference site 1 not participating in the conference | Conference site 2 not participating in the conference | Voice conference site 1 |
| Voice conference site 2 | | | |

FIG. 13

| Conference site 1 | Conference site 2 | Conference site 3 | Conference site 4 |
| --- | --- | --- | --- |
| Conference site 5 | Conference site 6 | Conference site 7 | Conference site 8 |
| Conference site 9 | Conference site 1 not participating in the conference | Conference site 2 not participating in the conference | Voice conference site 1 |
| Voice conference site 2 | | | |

SWAP ↕

| Conference site 1 | Conference site 2 | Conference site 3 | Conference site 4 |
| --- | --- | --- | --- |
| Conference site 5 | Conference site 6 | Conference site 7 | Conference site 8 |
| Conference site 9 | Conference site 1 not participating in the conference | Conference site 2 not participating in the conference | Voice conference site 1 |
| Voice conference site 2 | | | |

FIG. 15

IMAGE-BASED VIDEO CONFERENCE CONTROL METHOD, TERMINAL, AND SYSTEM

This application is a continuation of International Application No. PCT/CN2010/071516, filed on Apr. 2, 2010, which claims priority to Chinese Patent Application No. 200910038505.6, filed on Apr. 8, 2009, both of which are hereby incorporated by reference in their entireties.

FIELD OF THE INVENTION

The present invention relates to the field of network communications technologies, and in particular, to an image-based video conference control method, terminal, and system.

BACKGROUND OF THE INVENTION

As a professional video terminal, a current video conference terminal, unlike a consumer video terminal, always cannot provide a friendly, convenient, and direct-viewing Human Machine Interface (HMI). To modify conference configuration or perform conference control, it is needed to enter specific menu interfaces level by level for operation. Whether a web manner or a mouse manner is used, a user needs to spend a lot of time in understanding complicated meaning of an interface menu.

Meanwhile, various menu operation interfaces, including a transparent interface, a hidden interface, interface miniaturization, various shortcut keys, and a separately output interface, contest a limited display window with a conference site image to occupy a large display area of a display screen, no matter how good the interfaces are designed. A menu operation interface frequently used in a conference also distracts people's attention, so that what should be concerned in the conference may be missed. Even if a specialized person is assigned to maintain conference control, the preceding problems and disadvantages may still not be solved well.

Currently, two main video conference control methods exist. The first method is a director control method, that is, operations such as broadcasting a conference site, viewing a conference site, voice-controlled switching, multi-picture setting, and ending a video conference are performed on a central control operating console of a system. The second method is a chair terminal control method, that is, a chair terminal is set, and the operations such as broadcasting the conference site, viewing the conference site, voice-controlled switching, multi-picture setting, and ending the video conference are performed on the chair terminal.

In the first method, the video conference control is performed on the central control operating console of the system. Since a user of the video conference cannot feel existence of the operating console, it is unrealistic for a person participating in the video conference to directly perform the conference control on the operating console. An operator must be assigned to perform the video conference control at the background, and a video conference control command is sent by a video conference chair to the operator, and then the operator performs the video conference control according to the control command.

In the second method, the video conference control is implemented through the chair terminal. A conference terminal participating in the conference applies for being the chair terminal. After the application succeeds, the conference control is completed through an operation on an interface of the conference terminal. However, when the video conference control is implemented through the chair terminal, it is needed to enter specific menu interfaces level by level for operation, so a control operation is very tedious and annoying. In order to implement a video conference control operation such as ending the video conference, it is often needed to make multiple choices and enter a multi-level menu in order to find a relevant video conference control operation, which is rather inconvenient. Moreover, a control menu interface contests the limited display window with the conference site image, which distracts attention of a person participating in the conference.

During implementation of the present invention, the inventor finds that: In the first method, an operator must be assigned to perform the video conference control at the background, and a video conference control command needs to be sent by a video conference chair to the operator, and then the operator performs the video conference control according to the control command, so a situation of each conference site cannot be controlled in time according to a conference requirement. In the second method, it is needed to enter the specific menu interfaces level by level for selection operation, so the control operation is rather inconvenient. Besides, the control menu interface occupies the display window of each conference site image on the display screen, thereby influencing a conference viewing effect.

SUMMARY OF THE INVENTION

In order to solve the foregoing problem, embodiments of the present invention provide an image-based video conference control method, terminal, and system.

An embodiment of the present invention provides an image-based video conference control method, which includes:

sending a control request message to a network-side device;

dynamically displaying image information according to a control message fed back by the network-side device; and editing an image according to the image information to complete video conference control.

Furthermore, an embodiment of the present invention further provides a conference terminal, which includes:

a sending module, configured to receive a conference site remote control signal and send a control request message to a network-side device;

a display module, configured to dynamically display image information according to a control message fed back by the network-side device; and a control module, configured to edit an image according to the image information to complete video conference control.

Furthermore, an embodiment of the present invention further provides a multi-point conference control apparatus, which includes:

a maintaining and setting control module, configured to perform a maintaining and setting control operation on an image of a relevant local video source of a conference terminal, after receiving a request for maintaining and setting a local conference terminal sent by the conference terminal; and a conference control module, configured to perform an editing control operation on a playing situation of a conference site video source corresponding to each conference terminal in a conference, after receiving a video conference control request sent by the conference terminal, so as to complete video conference control.

Furthermore, an embodiment of the present invention further provides an image-based video conference control system, which includes:

a conference terminal, configured to send a control request message to a network-side device, and dynamically display image information according to a control message fed back by the network-side device, so as to edit and set an image to perform video conference control; and a multi-point conference control apparatus, configured to perform an editing control operation on a playing situation of a conference site video source corresponding to each conference terminal in a conference, after receiving a control request sent by the conference terminal, where the conference terminal and the multi-point conference control apparatus are connected through the Internet or a wireless communications network to transmit data.

Through the embodiments of the present invention, setting and editing are performed through the image information dynamically displayed on each conference terminal to implement various conference control operations in the video conference, so that a need of entering a multi-level menu to carry out complicated video conference control is avoided. A dynamic situation of each conference site can be observed in real time, which is more direct-viewing and easier than a process of entering the multi-level menu by performing keypressing operations to carry out selection. At the same time, no multi-level control menu contests the limited display window on the display screen with the conference site image, so that it is easy for a person participating in the conference to focus attention to view and listen to the content of the conference.

BRIEF DESCRIPTION OF THE DRAWINGS

FIG. 5 is a schematic control diagram of a conference chair terminal browsing multiple conference sites according to Embodiment 1 of the present invention;

FIG. 11 is a schematic control diagram of erasing an image of a sub-picture according to Embodiment 1 of the present invention;

FIG. 12 is a schematic control diagram of automatically filling the sub-picture according to Embodiment 1 of the present invention;

FIG. 13 is a schematic control diagram of zooming in/out a picture according to Embodiment 1 of the present invention;

FIG. 15 is a schematic control diagram of swapping sub-picture display positions according to Embodiment 1 of the present invention;

DETAILED DESCRIPTION OF THE EMBODIMENTS

In order to make the present invention more comprehensive, the present invention is further set forth with reference to the accompany drawings, but embodiments of the accompany drawings are not intended to limit the present invention.

Embodiments of the present invention provides an image-based video conference control method and system, which support all basic conference site control performed by directly operating a conference site picture on remote and local conference terminals. The control is the same in all combined-picture modes (including a single picture). Operating objects of the conference site control are conference site audio source code streams and video source code streams corresponding to all sub-pictures.

Embodiment 1

Figure 1:
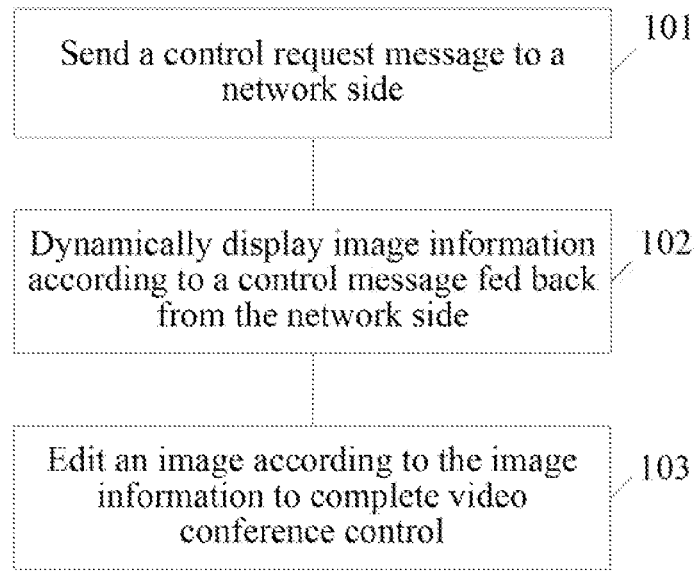
FIG. 1 is a flow chart of an image-based video conference control method according to Embodiment 1 of the present invention.

As shown in FIG. 1, Embodiment 1 of the present invention provides an image-based video conference control method, which includes the following steps:

101: Send a control request message to a network-side device.

The control request message is sent through a conference terminal to a multi-point conference control apparatus, that is, a multi-point conference control unit (MCU), at the network side. The control request message includes a request for maintaining and setting a local conference terminal and/or a request for controlling a remote video conference. Specifically, in the case of not participating in a conference, the request for maintaining and setting the local conference terminal is sent through the conference terminal to the multi-point conference control apparatus at the network side; in the case of participating in the conference, various requests for controlling the remote video conference are sent through the conference terminal to the multi-point conference control apparatus at the network side according to a conference requirement.

102: Dynamically display image information according to a control message fed back by the network-side device.

The conference terminal dynamically displays, according to the control message fed back by the multi-point conference control apparatus at the network side, image information of a local conference terminal video source or image information of a conference site video source corresponding to each conference terminal.

103: Edit an image according to the image information to complete video conference control.

In the case of not participating in the conference, through the conference terminal, when selecting a conference site browsing mode according to displayed address book information of the local conference terminal video source, a control person may perform operations of browsing, adding, modifying, or deleting content of an address book and convening a conference; or when selecting a non-conference site browsing mode according to displayed configuration image information of the local conference terminal video source, the control person may set a primary stream video source or a secondary stream video source at corresponding sub-picture positions of the local conference terminal respectively.

In the case of participating in the conference, through the conference terminal, when selecting the conference site browsing mode according to the displayed image information of the conference site video source corresponding to each conference terminal, the control person completes a video conference control operation by clicking and editing an image of each corresponding conference site video source; or when selecting the non-conference site browsing mode according to the displayed image information of the conference site video source corresponding to each conference terminal, the control person chooses to switch an image of the primary stream video source or the secondary stream video source in the conference.

The primary stream video source displays a video situation of a conference site corresponding to the conference terminal. The secondary stream video source displays a static picture or a dynamic picture that is played by a person at the conference site corresponding to the conference terminal, where the includes a demonstrated electronic document or electronic graph, and the dynamic picture includes a played video file or an input image of an external camera.

The method provided in the embodiment of the present invention supports a conference site control operation performed in all combined-picture modes. A person at each conference site may select a browsing mode on the conference terminal. The browsing mode includes the conference site browsing mode and the non-conference site browsing mode. The main difference between the conference site browsing mode and the non-conference site browsing mode lies in that, in the conference site browsing mode, a system automatically displays situations of all conference sites, and images of video sources corresponding to all the conference sites in the conference may be browsed and controlled; while in the non-conference site browsing mode, the system cannot automatically display the situations of all the conference sites, objects of the conference site control and the number of the objects of the conference site control are limited by a specific combined-picture mode. For example, in the case of a single picture, the conference site control operation can be performed for only one video source.

The conference site browsing mode is also a virtual scene mode. The combined-picture modes supported in the conference site browsing mode include a single-picture mode, a two-picture mode, a four-picture mode, a nine-picture mode, and a sixteen-picture mode. In the case of a point-to-point call, the four-picture mode is taken as a default mode; and in the case of a multi-point call, the sixteen-picture mode is taken as a default mode. According to the control information fed back by the MCU, the conference terminal dynamically displays a conference list formed from the image information of each conference site.

In order to implement the method of the present invention, a person participating in the conference may complete, according to image information of sub-pictures of a relevant conference site in the displayed conference list, a corresponding conference site control operation by directly pressing a key on the conference terminal or through a function key of a relevant remote controller. For example, operations such as viewing a conference site, voice-controlled switching, multi-picture setting, switching, requesting speaking, and ending a video conference may be controlled. The specific implementation is described in the following embodiments.

Figure 2:
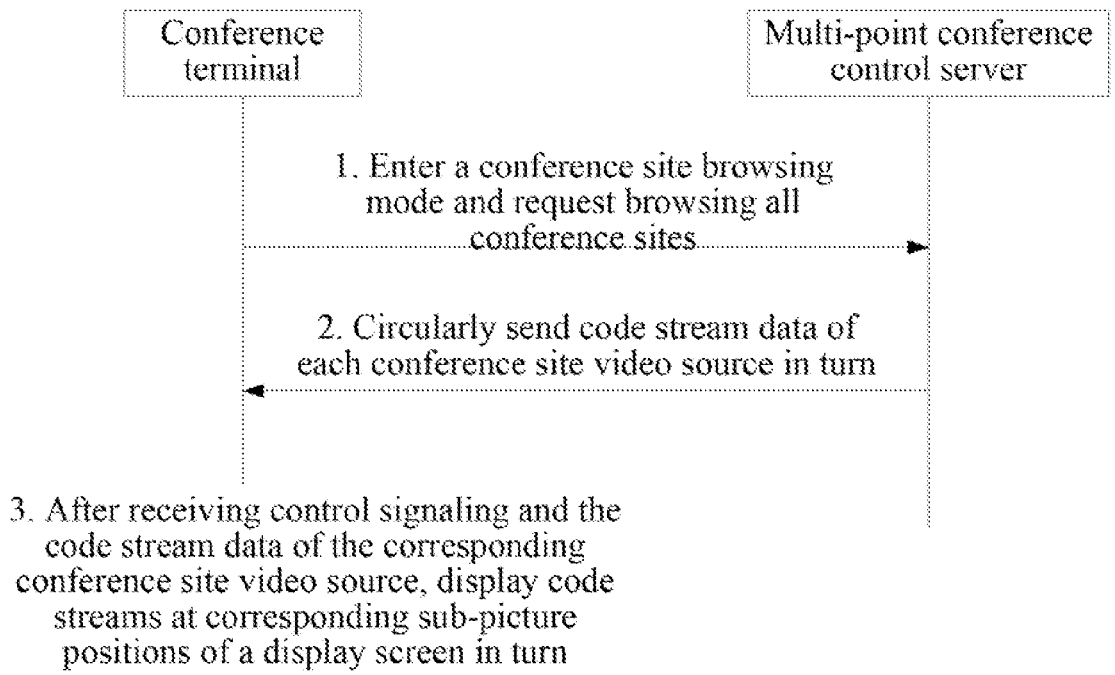
FIG. 2 is a flow chart of performing conference site browsing control through relevant keys of a remote controller in a conference site browsing mode according to Embodiment 1 of the present invention.

As shown in FIG. 2, a process of dynamically browsing the conference list in the conference site browsing mode is as follows:

1. After the conference terminal applies for participating in the remote video conference, for example, a DIRECTORY key (this key may reuse another key on the remote controller or may be newly defined) on the remote controller is pressed, so that the conference terminal directly enters the conference site browsing mode, and sends a request for browsing all the conference sites to the multi-point conference control apparatus. In this implementation manner, the multi-point conference control apparatus may be a multi-point conference control server of a remote conference system.

2. The multi-point conference control server sends, in turn according to conference site list information, code stream data of a video source from each conference site to the conference terminal requesting browsing the conference sites, and the multi-point conference control server controls circular sending of the code stream data of a corresponding conference site and circular updates of an image of each conference site.

3. After receiving control signaling and the code stream data of the corresponding conference site, the conference terminal displays code streams at corresponding sub-picture positions of a display screen in turn, saves and preserves a screenshot of a last code stream, and maintains conference site index information. A preserved static image of each code stream may be used to browse the conference site next time or may be used for an address book, a group book, a call record, or a log, which is recorded as auxiliary information. A multi-picture of remote conference site video sources is generally a one-way code stream, and the conference terminal needs to distinguish positions of different conference site video sources in the multi-picture. In one aspect, when setting the multi-picture, the multi-point conference control \server sends corresponding sub-picture position information of each conference terminal in the multi-picture to each conference terminal through signaling; in another aspect, when applying for participating in the remote video conference, each conference terminal sends a query about the corresponding sub-picture position information of the conference terminal in the multi-picture of its own screen to the multi-point conference control server. If the conference site video sources are excessive, when no blank sub-picture position is displayed in the current conference site browsing mode, a video of the corresponding conference site is not displayed, but decoding is performed normally, and after another conference site quits the conference and releases conference resources, the video of the corresponding conference site is displayed.

Figures 3, 4:
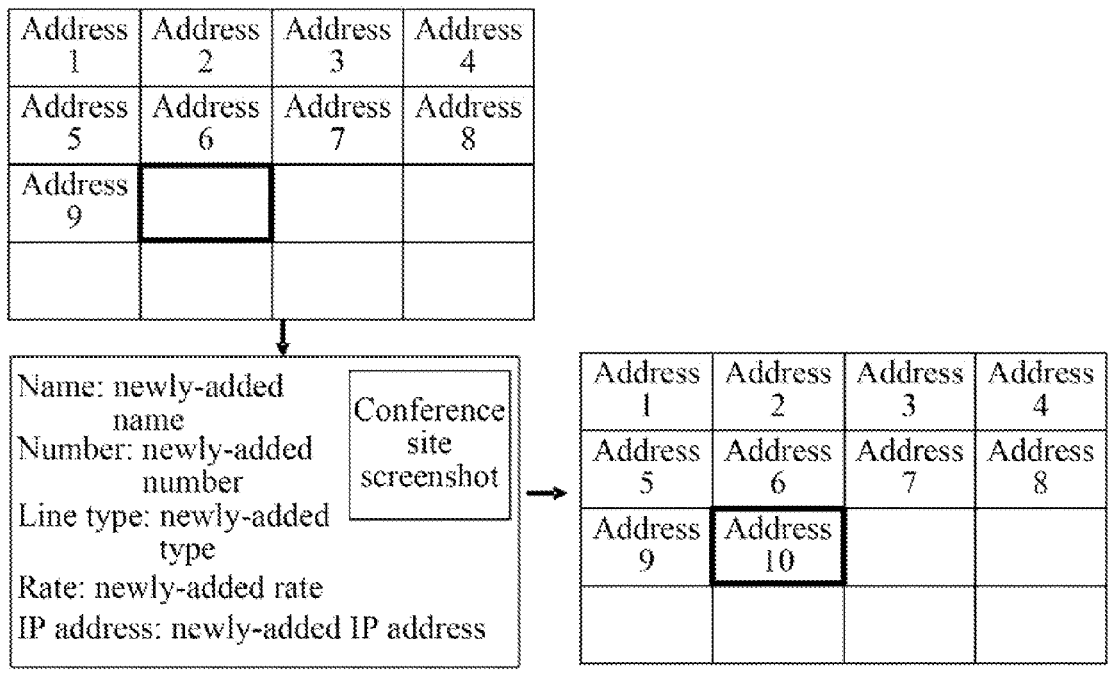
FIG. 3 is a schematic control diagram of viewing a conference site list through the remote controller according to Embodiment 1 of the present invention.
FIG. 4 is a schematic control diagram of controlling a new conference terminal to participate in a conference according to Embodiment 1 of the present invention.

As shown in FIG. 3, after a conference is established, a person at the conference site may view a conference site list through up, down, left, and right direction keys of the remote controller, that is, a twinkling conference site sub-picture box is moved to view the conference site list. A conference site not participating in the conference and an audio-only conference site are displayed by using a default graph.

A conference chair terminal may view the whole conference site list, and relevant conference site control in the video conference is completed, according to image information displayed by each conference terminal, by operating function keys of the remote controller. As shown in FIG. 4, when a new conference terminal needs to participate in the conference, specific control steps are as follows:

(1) The new conference terminal that needs to participate in the conference sends a participation applying signal to the multi-point conference control server through a key of the remote controller.

(2) The multi-point conference control server forwards the participation applying signal to the conference chair terminal, and displays relevant information, including a conference site name, a number, a line type, a rate, an Internet Protocol (IP) address, and so on, about the new conference terminal is displayed in a conference site status bar of the display screen.

(3) The conference chair terminal enters the conference site browsing mode to view the whole conference site list, and selects a blank sub-picture position through the up, down, left, and right direction keys of the remote controller to add the relevant information about the new conference terminal, which includes an operation such as adding a caption to identify the conference site name or selecting a video source, and finally, displays a video of the new conference terminal at the determined blank sub-picture position.

As shown in FIG. 5, if the number of conference sites in the conference is large, for example, eighteen conference sites exist, and not all the conference sites can be displayed on the display screen at the same time, rollback display can be performed through the up and down direction keys or scrolling display may be performed through a PAGE UP key or a PAGE DOWN key, so as to perform a selection switching operation of relevant video sources and audio sources.

An image-based conference control process in a conference terminal system is described in detail below with an operation manner. In the embodiment of the present invention, the specific operation process is described with reference to a conference terminal user using the remote controller. A function of a key of the remote controller required in the embodiment of the present invention is not specifically defined and limited. It may be understood that, the conference terminal user may also use another control manner to control the video conference.

1. Steps of setting a local input video source are as follows:

(1) In the case of not holding a conference, select the non-conference site browsing mode, set and define a sub-picture position 1 for displaying a local primary stream video source, and define a sub-picture position 2 for displaying a local secondary stream video source.

(2) Select the sub-picture position 1 or the sub-picture position 2 and double-click an image box for activation, and perform an operation of selecting a video source and adding the video source to a corresponding sub-picture in a matching manner. At this time, an image video source displayed at the sub-picture position 1 is the local primary stream video source set currently, and an image video source displayed at the sub-picture position 2 is the local secondary stream video source set currently.

Figure 6:
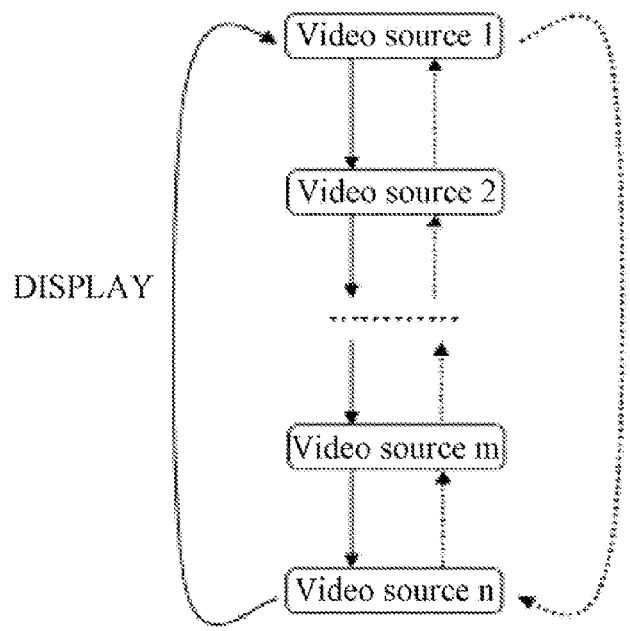
FIG. 6 is a schematic control diagram of selecting a picture for displaying a video source in a non-conference site browsing mode according to Embodiment 1 of the present invention.

2. As shown in FIG. 6, in the non-conference site browsing mode, control steps of selecting a picture to display a video source are as follows:

(1) In the non-conference site browsing mode, select and then double-click one or multiple pictures.

(2) Press a DISPLAY key of the remote controller to switch the video source displayed in the picture.

(3) Switch all the video sources in turn according to a default order, where the switching occurs each time the key is pressed.

(4) In the case of not holding the conference, through the conference terminal, choose to switch the local primary stream video source or local secondary stream video source at the corresponding sub-picture position, for example, choose to switch local conference site video and audio signals, a camera signal input by the local conference site, and a demonstration electronic document input by an external computer of the local conference site; in the case of holding the conference, through the conference terminal, choose to switch the primary stream video source or the secondary stream video source in the conference according to a conference requirement. For example, when a person at a conference site A speaks, the system records the primary stream video source of the conference site A and broadcasts the primary stream video source to each conference terminal in the conference. If the person at the conference site A needs to demonstrate a WORD document of an external computer, the secondary stream video source may be switched to in order to display the WORD document.

Figure 7:
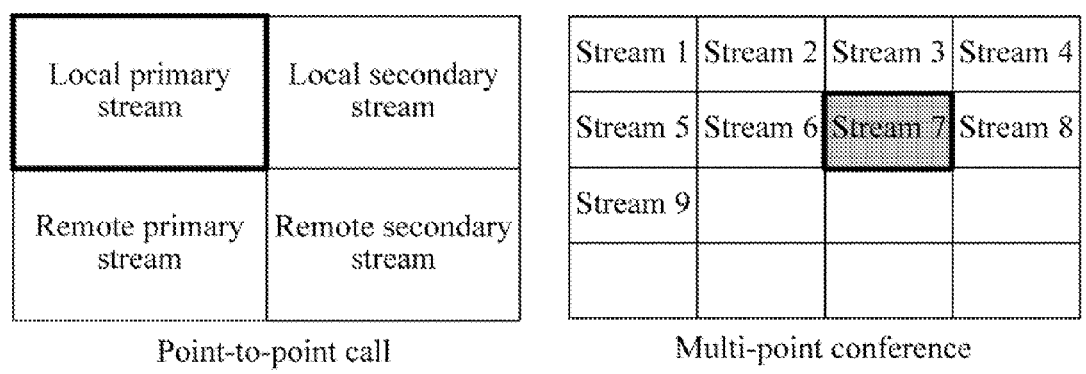
FIG. 7 is a schematic control diagram of selecting a picture for displaying a video source in the conference site browsing mode according to Embodiment 1 of the present invention.

3. As shown in FIG. 7, in the conference site browsing mode, control steps of selecting a picture to display a video source are as follows:

(1) In the conference site browsing mode, select a first browsed sub-picture to double-click.

(2) Press the DISPLAY key of the remote controller to switch the video sources displayed by each picture.

(3) Switch all the video sources starting from the first browsed sub-picture in turn according to a default order for display. A display effect is similar to a nine-picture preview effect of a VCD/DVD. As shown in FIG. 7, for example, during a point-to-point call, the conference site browsing mode is selected, and then a four-picture is entered, where a local primary stream, a local secondary stream, a remote primary stream, and a remote secondary stream are displayed in turn. In the large whole conference display screen, a total of nine video sources exist in the multi-point conference. The MCU currently sends and updates an image of a code stream 7. Sub-picture positions of code streams 1, 2, 3, 4, 5, 6, 8, and 9 maintain displaying static images after a last update. A code stream to be updated next time is the code stream 8.

4. Steps of setting a viewing video source of the local conference site are as follows:

(1) In the conference site browsing mode, in the multi-point conference, select one or two pictures in turn, and press a SOURCE key twice for activation.

(2) If only one picture is activated, it is stipulated that the viewing video source of the local conference site is set, where the set viewing video source is a display video source of the selected picture.

Figure 8:
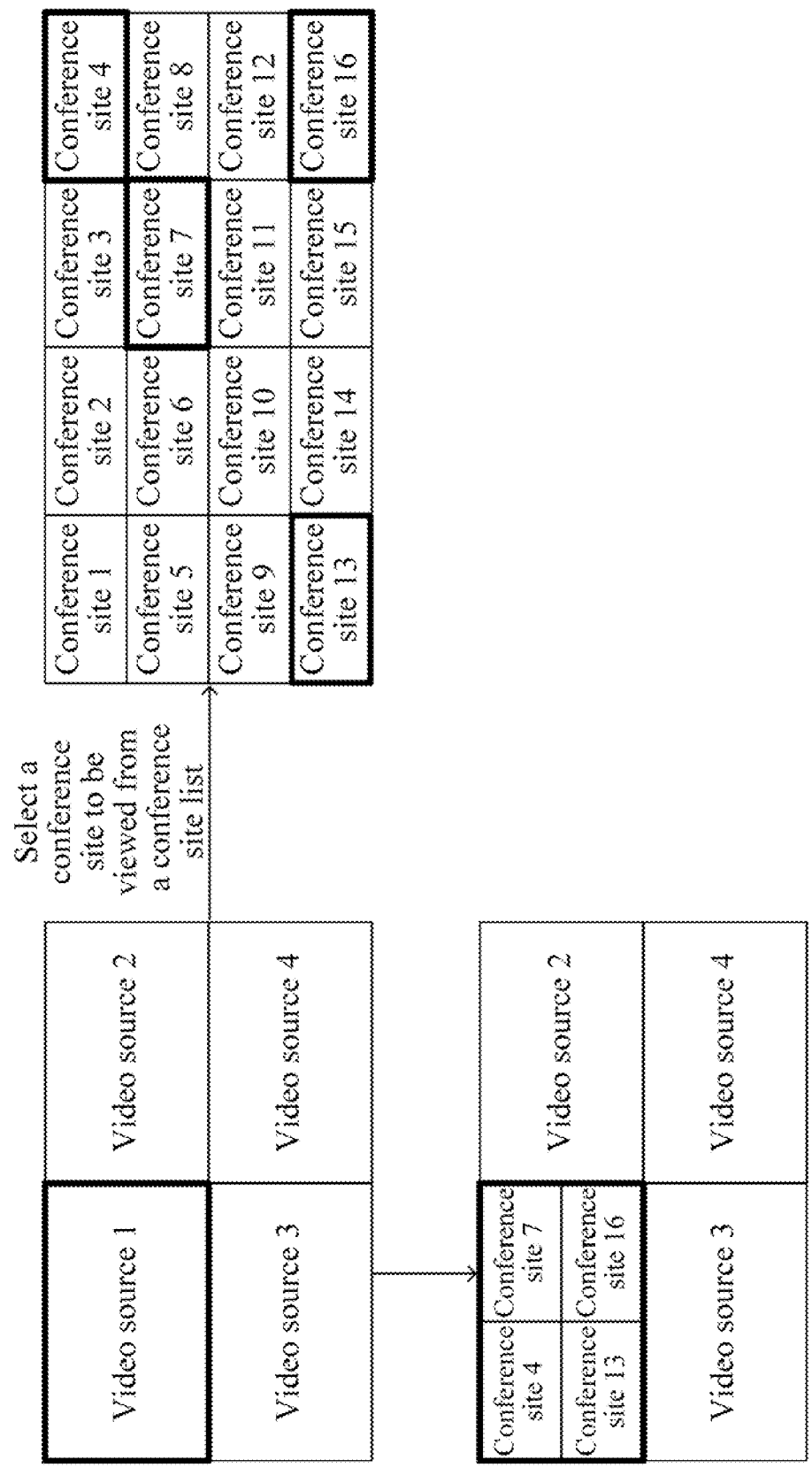
FIG. 8 is a schematic control diagram of setting a viewing video source of a local conference site according to Embodiment 1 of the present invention.

As shown in FIG. 8, for example, the picture (for example, the four-picture) is viewed at the current local conference site, and the viewing video source of the local conference site is set. The conference site list is entered to select a conference site image (one or more images) to be viewed. If four conference sites are selected, after the SOURCE key is pressed, the selected conference sites in the conference site list are displayed in the local conference site in a form of multi-picture combination, that is, images of conference sites 4, 7, 13, and 16 are displayed in a viewing picture of the local conference site video source 1.

(3) If two pictures are activated, it is stipulated that the viewing video source of a conference site corresponding to a first picture is the video source of a conference site corresponding to a second picture (only for a conference site having a permission to set a conference site code stream).

Figure 9:
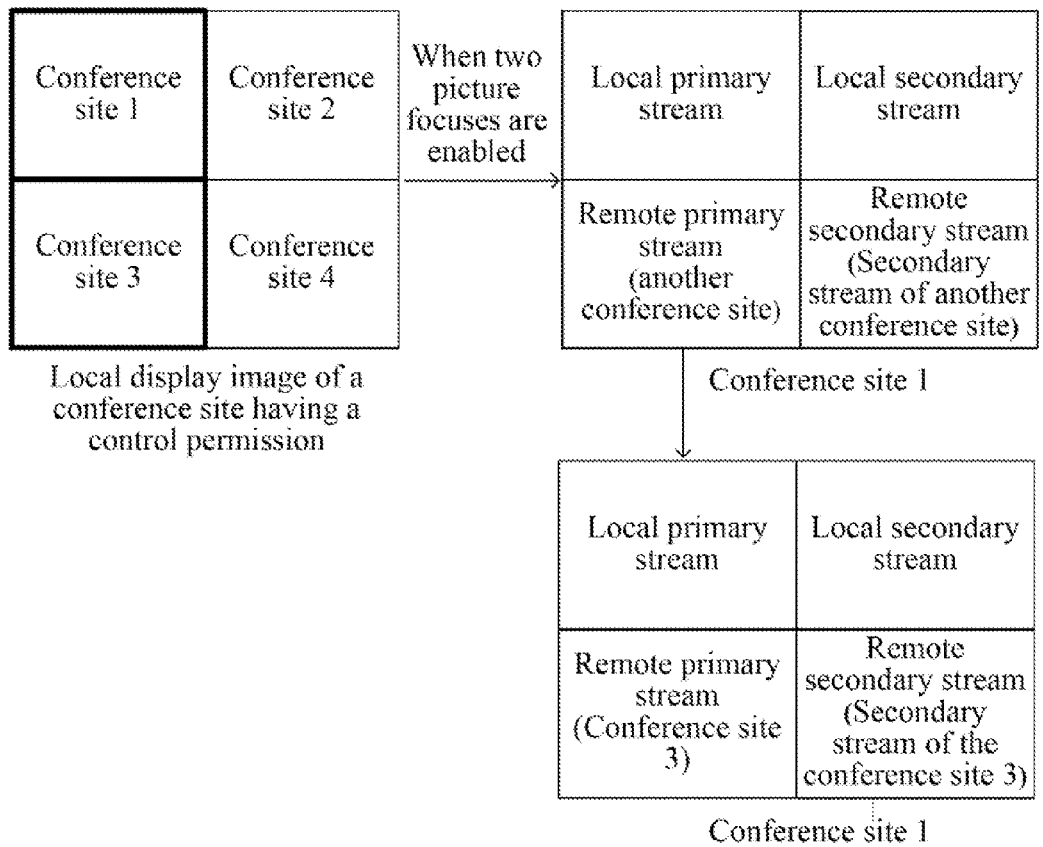
FIG. 9 is a schematic control diagram of setting a viewing video source of another conference site according to Embodiment 1 of the present invention.

As shown in FIG. 9, conference sites 1 to 4 correspond to video sources 1 to 4. Locally displaying the four-picture is taken as an example. The conference site 1 and the conference site 3 are enabled, and a conference site (another conference site) viewed in the conference site 1 is switched to display a picture of the conference site 3. If the viewed conference site (for example, the conference site 3) sends a secondary stream at the same time, a remote secondary stream picture viewed in the conference site 1 is switched to display the secondary stream of the conference site 3.

5. A process of controlling speaking in the conference is as follows:

For example, if another conference site wants to speak, an applying signal is sent to the multi-point conference control server through an "applying for speaking" key on the remote controller. The multi-point conference control server controls a screen image of a sub-picture corresponding to the conference site needing to speak that is twinkling on the display screen of each conference terminal, so as to prompt that which conference site needs to speak, and a conference terminal that finishes speaking releases the conference resources after the speaking ends to the conference terminal applying for speaking.

Various manners of operating a sub-picture are described in detail below.

1. A highlight box shows a sub-picture selected by a current user.

Figure 10:
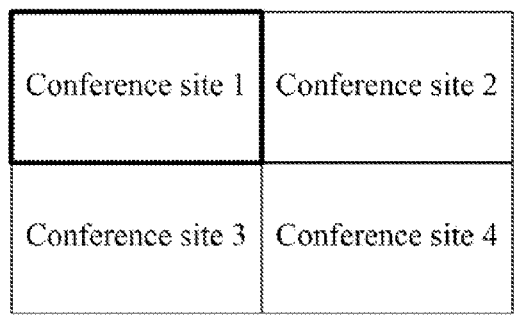
FIG. 10 is a schematic diagram of a highlight box showing a sub-picture selected by a current user according to Embodiment 1 of the present invention.

As shown in FIG. 10, the highlight box, that is, a twinkling box for prompting the user, exists in the current sub-picture in a combined picture selected by the user. When the user does not perform a video source switching operation on the current sub-picture in a period of time, the highlight box disappears automatically. In FIG. 10, the sub-picture (the conference site 1) at an upper-left corner of the combined picture represents a currently selected sub-picture, and the user can operate the sub-picture.

2. An operation of erasing a picture is shown in FIG. 11.

(1) In the non-conference site browsing mode, select one or multiple pictures to click, so as to activate the picture.

(2) Press a BACKSPACE key to erase the picture, so no image is displayed at the selected sub-picture position.

3. An operation of automatically filling a picture is shown in FIG. 12.

(1) In the non-conference site browsing mode, select one or multiple blank pictures to double-click for activation.

(2) Press the DISPLAY key, and fill all the displayed selected blank pictures by using a current video source.

4. An operation of zooming in/out a picture is shown in FIG. 13.

(1) In the conference site browsing mode or the non-conference site browsing mode, select one or multiple pictures to double-click for activation.

(2) After a ZOOM IN/ZOOM OUT key is pressed, the selected picture is zoomed in/out.

(3) If the selected picture corresponds to the local conference site video source, perform local camera control or local encoding and decoding zooming in/out.

(4) If the selected picture corresponds to the remote conference site video source, request remote camera control.

Figure 14:
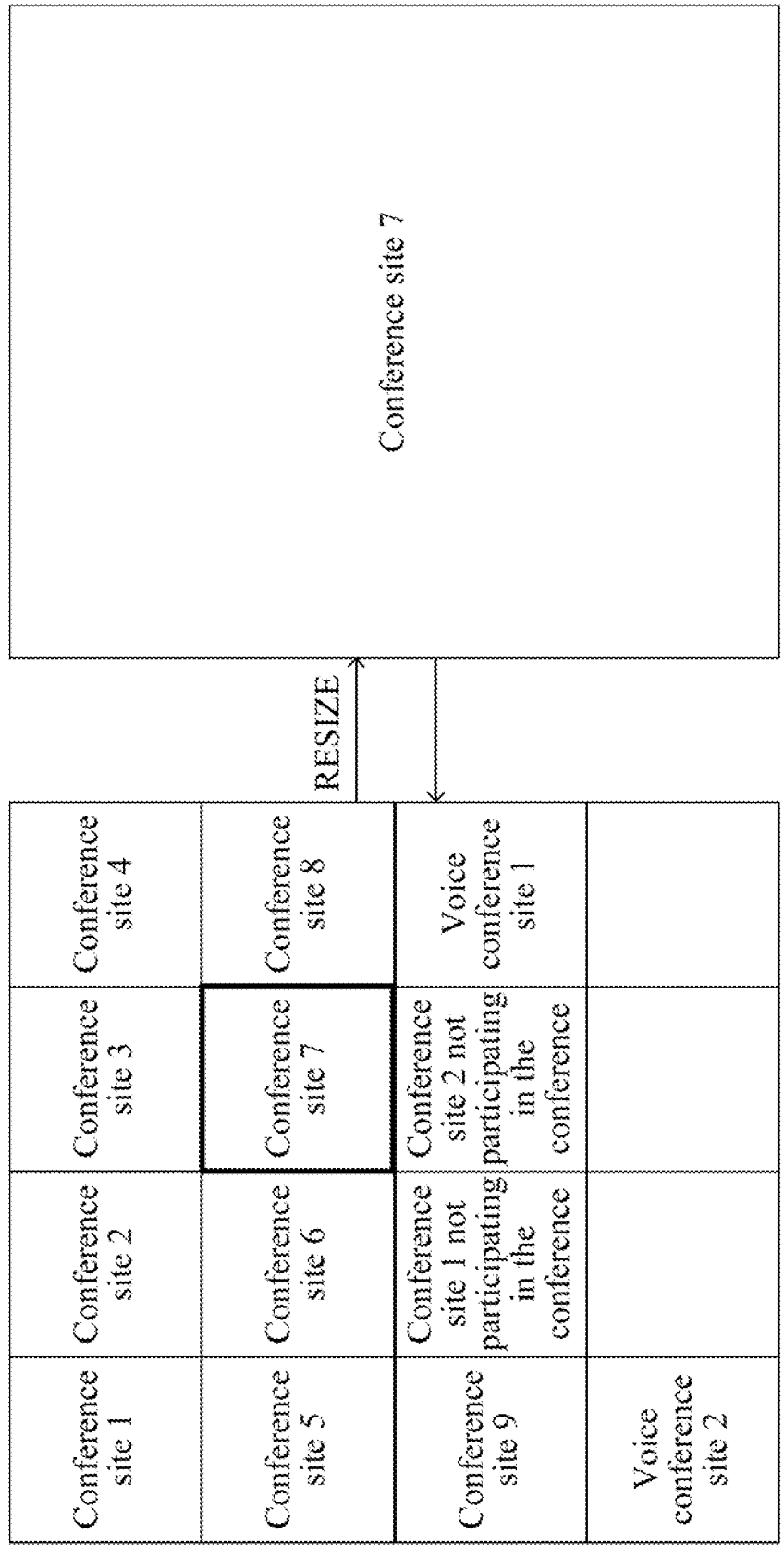
FIG. 14 is a schematic control diagram of viewing/canceling a full screen according to Embodiment 1 of the present invention.

5. An operation of viewing/canceling a full screen is shown in FIG. 14.

(1) In the conference site browsing mode or the non-conference site browsing mode, select one picture to double-click for activation.

(2) Press a RESIZE key. If a picture focus is a sub-picture in the multi-picture, the sub-picture is switched to be displayed in the single-picture mode; if the picture focus is a single-picture, the picture is switched to be displayed in the original multi-picture mode; and if the original multi-picture mode does not exist, no process is performed.

6. An operation of choosing to be a main sub-picture.

(1) In the non-conference site browsing mode, select one picture to double-click for activation.

(2) After a SWAP key is pressed, the system determines that only one picture is double-clicked and activated, and automatically swaps a video of a current main sub-picture for a video source of the selected picture, so that the video source of the selected picture becomes a new main sub-picture.

7. An operation of swapping picture display positions is shown in FIG. 15.

(1) In the conference site browsing mode or the non-conference site browsing mode, select two pictures to double-click for activation.

(2) Press the SWAP key to swap display video sources at two picture positions.

A process of operating conference control is described in detail below.

Figure 16:
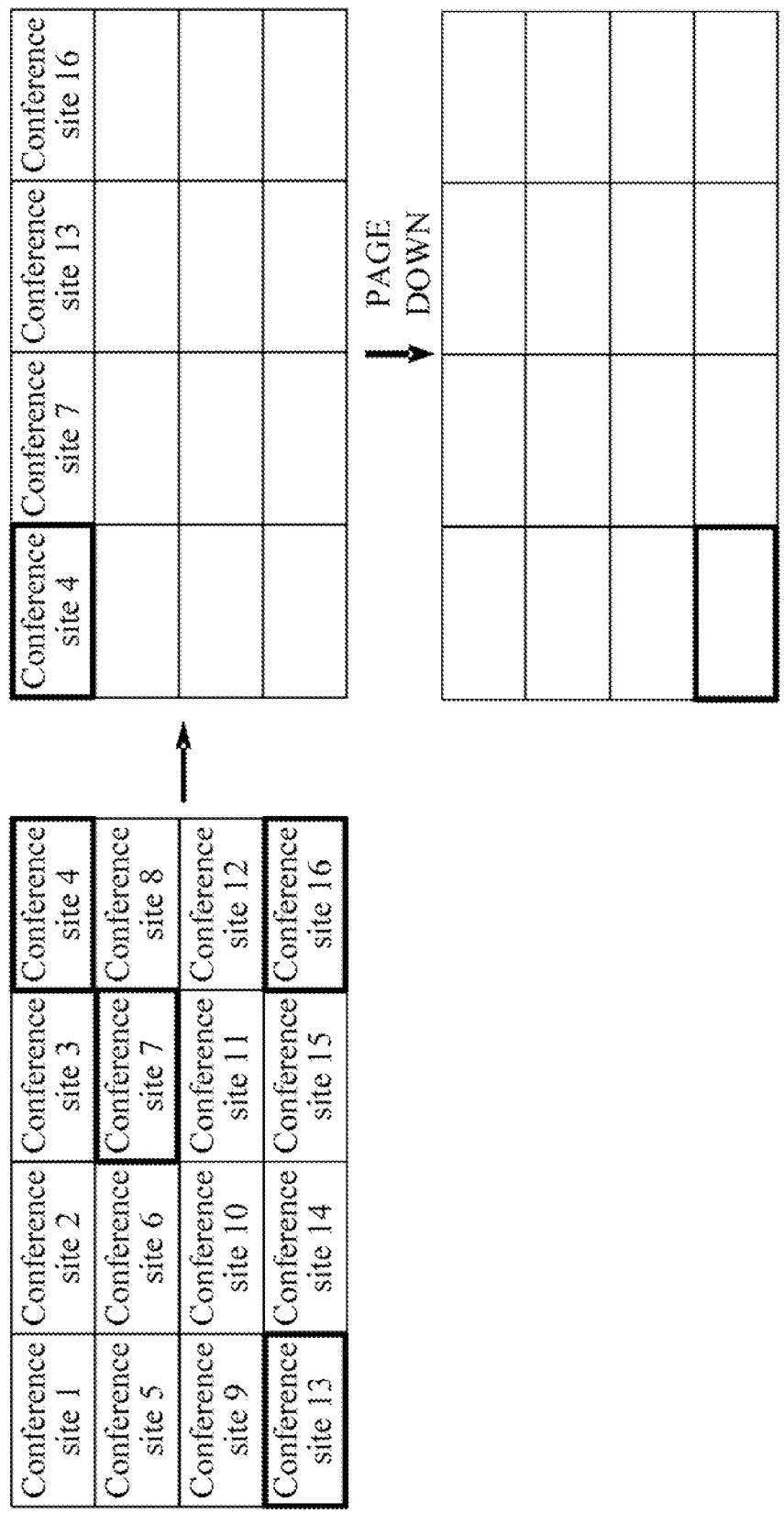
FIG. 16 is a schematic control diagram of setting local multi-picture display according to Embodiment 1 of the present invention.

1. Set local multi-picture display, as shown in FIG. 16.

(1) In the conference site browsing mode or the non-conference site browsing mode, select one or multiple pictures to double-click for activation.

(2) Press a LAYOUT key. In the multi-point conference, a request for viewing a specified multi-picture is sent to the MCU, a new combined-picture mode is switched to, and the selected one or multiple pictures are displayed. The new combined-picture mode can just satisfy the display of the selected picture; the largest is a sixteen-picture. If the number of the selected pictures is greater than 16, a next page is jumped to for display.

2. Steps of broadcasting the conference site or the multi-picture are as follows.

(1) In the conference site browsing mode, select one or multiple pictures to double-click for activation.

(2) Press the DISPLAY key to request broadcasting the conference site or the multi-picture. The selected video source is just displayed in the multi-picture mode by default.

3. Steps of applying for/releasing the conference chair terminal are as follows:

(1) In the conference site browsing mode or the non-conference site browsing mode, press a function key F1 to directly apply for/release the conference chair terminal.

(2) The system displays a state of the conference chair terminal by adding a caption or an icon in the picture.

4. Polling (1) In the conference site browsing mode, select one or multiple pictures to double-click for activation.

(2) Press a function key F2 to quit the conference site browsing mode, and perform polling on the selected video source at a main sub-picture position or a single picture in an original combined-picture mode.

In addition to the foregoing conference control operations, the present invention also supports some other undefined conference control operations, including a basic conference control operation, address book modification and deletion, conference convening/call initiation, a request for viewing a remote, conference site secondary stream, and a request for viewing a formulated combined picture in a specified conference site, which can all be implemented through the method of the present invention.

For defining functions of the keys of the remote controller, besides defining single keys as described in the foregoing, in specific implementation, a function key manner or a combined key manner may also be used.

Embodiment 2

Figure 17:
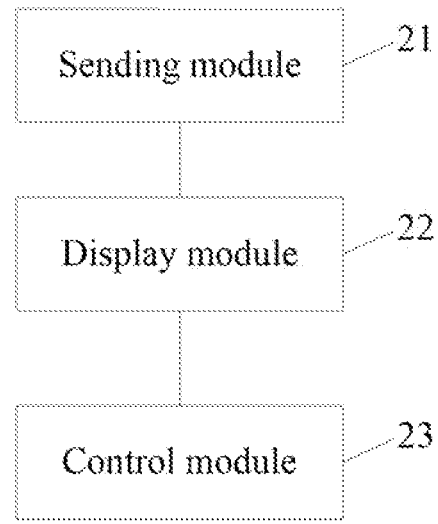
FIG. 17 is a schematic structural diagram of a conference terminal according to Embodiment 2 of the present invention.

As shown in FIG. 17, Embodiment 2 of the present invention provides a conference terminal, which includes a sending module 21, a display module 22, and a control module 23.

The sending module 21 is configured to receive a conference site remote control signal and send a control request message to a network-side device.

The display module 22 is configured to dynamically display image information according to a control message fed back by the network-side device.

The control module 23 is configured to edit an image according to the image information to complete video conference control.

The display module 22 is configured to display image information of a local conference terminal video source according to a maintaining and setting control message fed back by the network-side device; or displays image information of a conference site video source corresponding to each conference terminal according to a conference control message fed back by the network-side device.

Figure 18:
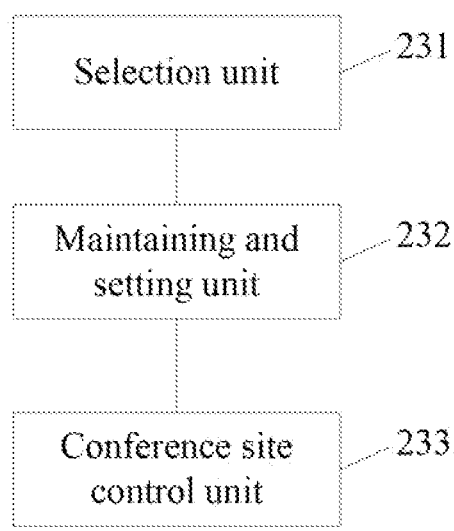
FIG. 18 is a schematic structural diagram of a control module of the conference terminal according to Embodiment 2 of the present invention.

As shown in FIG. 18, the control module 23 includes a selection unit 231, a maintaining and setting unit 232, and a conference site control unit 233.

The selection unit 231 is configured to select a conference site browsing mode or a non-conference site browsing mode.

The maintaining and setting unit 232 is configured to: when the conference site browsing mode is selected according to displayed address book information of the local conference terminal video source, perform operations of browsing, adding, modifying, or deleting content of an address book and convening a conference; or when the non-conference site browsing mode is selected according to displayed configuration image information of the local conference terminal video source, set a primary stream video source or a secondary stream video source at corresponding sub-picture positions of the local conference terminal respectively.

The conference site control unit 233 is configured to: when the conference site browsing mode is selected according to the displayed image information of the conference site video source corresponding to each conference terminal, complete a video conference control operation by clicking and editing an image of each corresponding conference site video source; or when the non-conference site browsing mode is selected according to the displayed image information of the conference site video source corresponding to each conference terminal, choose to switch an image of the primary stream video source or the secondary stream video source in the conference.

Embodiment 3

Figure 19:
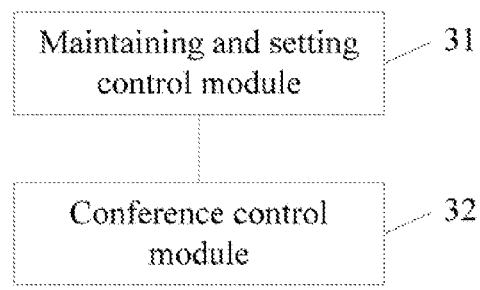
FIG. 19 is a schematic structural diagram of a multi-point conference control apparatus according to Embodiment 3 of the present invention.

As shown in FIG. 19, Embodiment 3 of the present invention provides a multi-point conference control apparatus, which includes a maintaining and setting control module 31 and a conference control module 32.

The maintaining and setting control module 31 is configured to perform a maintaining and setting control operation on an image of a relevant local video source of a conference terminal, after receiving a request for maintaining and setting a local conference terminal sent by the conference terminal.

The conference control module 32 is configured to perform an editing control operation on a playing image of a conference site video source corresponding to each conference terminal in a conference, after receiving a video conference control request sent by the conference terminal.

The maintaining and setting control module includes a maintaining control unit and a setting control unit.

The maintaining control unit is configured to send address book information of the conference terminal and perform control operations of browsing, adding, modifying, or deleting content of an address book and convening a conference, after receiving the request for maintaining the local conference terminal sent by the conference terminal.

The setting control unit is configured to send configuration image information of the video source and control setting a primary stream video source or a secondary stream video source at corresponding sub-picture positions of the conference terminal respectively, after receiving the request for setting the local conference terminal sent by the conference terminal.

The conference control module includes a browsing control unit and a conference control unit.

The browsing control unit is configured to circularly send video and audio code streams of all conference sites in the conference to a conference terminal that requests participating in a remote video conference in turn and dynamically display an image of each corresponding conference site video source in a sub-picture of a screen of the conference terminal, after receiving a request for participating in the remote video conference sent by the conference terminal.

The conference control unit is configured to perform an editing control operation on each conference site video signal dynamically displayed in the sub-picture of the screen of the conference terminal, after receiving a conference site control request sent by the conference terminal.

Embodiment 4

Figure 20:
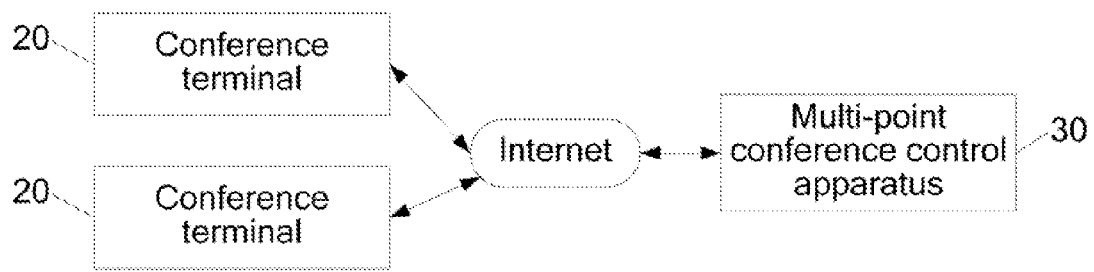
FIG. 20 is a schematic structural diagram of an image-based video conference control system according to Embodiment 4 of the present invention.

As shown in FIG. 20, Embodiment 4 of the present invention provides an image-based video conference control system, which includes a conference terminal 20 and a multi-point conference control apparatus 30.

The conference terminal 20 is configured to receive a conference site remote control signal, send a control request message to a network-side device, and dynamically display image information according to a control message fed back by the network-side device, so as to edit and set an image to perform video conference control.

The multi-point conference control apparatus 30 is configured to perform an editing control operation on a playing situation of a conference site video source corresponding to each conference terminal in a conference, after receiving a control request sent by the conference terminal.

The conference terminal and the multi-point conference control apparatus are connected through the Internet or a wireless communications network to transmit data.

Through the embodiments of the present invention, a single or multiple conference site pictures may be directly selected for operation according to abundant information provided by each conference site picture in combination with an operation of the remote controller, so that all kinds of conference control operations in a video conference are implemented, and a need of entering a multi-level menu to carry out complicated video conference control is avoided. A situation of each conference site can be observed in real time, which is more direct-viewing than a process of entering the multi-level menu by performing key-pressing operations to carry out selection. At the same time, no multi-level control menu contests the limited display window on the display screen with the conference site image, so that it is easy for an operator to focus attention.

A person skilled in the art may understand that, all or a part of processes in the methods according to the embodiments may be accomplished by relevant hardware under instruction of a computer program. The program may be stored in a computer-readable storage medium. When the program is executed, the processes of the methods according to the embodiments of the present invention are performed. The storage medium may be a magnetic disk, a Compact Disk-Read Only Memory (CD-ROM), a Read-Only Memory (ROM), a Random Access Memory (RAM), and the like.

The foregoing describes only exemplary embodiments of the present invention. Definitely, the scope of the present invention is not limited thereto. It should be noted that, several improvements and modifications may be made by a person skilled in the art without departing from a principle of the present invention. The present invention may also be applicable to all other situations where a control function needs to be implemented through an image operation on a terminal interface, including, but not limited to, a video conference and TV monitoring. These improvements and modifications also fall in the protection scope of the present invention.

What is claimed is:

1. An image-based human machine interface (HMI) video conference control method, comprising:
   sending by a local conference terminal, a control request message to a network-side device;
   dynamically displaying on the HMI of the local conference terminal, image information comprises one or more remote conference site providing multimedia content for video conference according to a control message fed back by the network-side device; and
   utilizing the HMI on the local conference terminal, editing an image representing a remote conference site to be selected for joininq or not joininq, according to the image information in order to complete the image-based HMI video conference control.

2. The video conference control method according to claim 1, wherein the control request message comprises a request for maintaining and setting the local conference terminal and/or a remote video conference control request.

3. The video conference control method according to claim 1, wherein the image information comprises image information of a local conference terminal video source or image information of a conference site video source corresponding to each conference terminal.

4. The video conference control method according to claim 1, comprising: after displaying the image information, selecting a browsing mode to edit and set the image information of displayed video sources respectively to complete a video conference control operation.

5. The video conference control method according to claim 4, wherein the image information of the local conference terminal video source comprises address book information and configuration image information;
   when a conference site browsing mode is selected according to the displayed address book information of the local conference terminal video source, perform operations of browsing, adding, modifying, or deleting content of an address book and convening a conference; and
   when a non-conference site browsing mode is selected according to the displayed configuration image information of the local conference terminal video source, set a primary stream video source or a secondary stream video source at corresponding sub-picture positions of the local conference terminal respectively.

6. The video conference control method according to claim 4, wherein
   when a conference site browsing mode is selected according to the displayed image information of the conference site video source corresponding to each conference terminal, complete the video conference control operation by clicking and setting an image of the each corresponding conference site video source; and
   when a non-conference site browsing mode is selected according to the displayed image information of the conference site video source corresponding to each conference terminal, choose to switch an image of a primary stream video source or a secondary stream video source in the conference.

7. The video conference control method according to claim 5, wherein the primary video source displays a video situation of a conference site corresponding to the conference terminal, the secondary video source displays a static picture or a dynamic picture that is played by a person at the conference site corresponding to the conference terminal, the static picture comprises a demonstrated electronic document or electronic graph, and the dynamic picture comprises a played video file or an input image of an external camera.

8. The video conference control method according to claim 6, wherein the primary video source displays a video situation of a conference site corresponding to the local conference terminal, the secondary video source displays a static picture or a dynamic picture that is played by a person at the conference site corresponding to the local conference terminal, the static picture comprises a demonstrated electronic document or electronic graph, and the dynamic picture comprises a played video file or an input image of an external camera.

9. A conference terminal, comprising:
   an image-based human machine interface (HMI);
   a sending module, which sends a control request message to a network-side device;
   a display module, which dynamically displays on the HMI of the local conference terminal, image information comprises one or more remote conference site providing multimedia content for video conference according to a control message fed back by the network-side device; and
   a control module, utilizes the HMI on the local conference terminal to edit an image representing a remote conference site to be selected for joining or not joining, according to the image information in order to complete video conference control.

10. The conference terminal according to claim 9, wherein the display module displays on the HMI, image information of a local conference terminal video source according to a maintaining and setting control message fed back by the network-side device; or displays on the HMI, image information of a conference site video source corresponding to each conference terminal according to a conference control message fed back by the network-side device.

11. The conference terminal according to claim 9, wherein the control module comprises:
   a selection unit, configured to select a conference site browsing mode or a non-conference site browsing mode;
   a maintaining and setting unit, wherein when the conference site browsing mode is selected according to displayed address book information of a local conference terminal video source, performs operations of browsing, adding, modifying, or deleting content of an address book and convening a conference; or when the non-conference site browsing mode is selected according to displayed configuration image information of the local conference terminal video source, sets a primary stream video source or a secondary stream video source at corresponding sub-picture positions of a local conference terminal respectively; and
   a conference site control unit, wherein when the conference site browsing mode is selected according to displayed image information of a conference site video source corresponding to each conference terminal, completes a video conference control operation by clicking and editing an image of each corresponding conference site video source; or when the non-conference site browsing mode is selected according to the displayed image information of the conference site video source corresponding to each conference terminal, chooses to switch an image of the primary stream video source or the secondary stream video source in the conference.

12. A multi-point conference control apparatus, comprising:
   a maintaining and setting control module, which performs a maintaining and setting control operation on an image which represents a relevant local video source of a conference terminal, after receiving a request for maintaining and setting a local conference terminal sent by the conference terminal; and
   a conference control module, which performs an editing operation on a playing image of a conference site video source corresponding to an image-based human machine interface (HMI) of each conference terminal in a conference, after receiving a video conference control request sent by the conference terminal, so as to complete the image-based HMI video conference control.

13. The multi-point conference control apparatus according to claim 12, wherein the maintaining and setting control module comprises:
   a maintaining control unit, which sends address book information of the conference terminal and performs control operations of browsing, adding, modifying, or deleting content of an address book and convening a conference, after receiving the request for maintaining the local conference terminal sent by the conference terminal; and
   a setting control unit, which sends configuration image information of the video source and controls setting a primary stream video source or a secondary stream video source at corresponding sub-picture positions of the conference terminal respectively, after receiving the request for setting the local conference terminal sent by the conference terminal.

14. The multi-point conference control apparatus according to claim 12, wherein the conference control module comprises:
   a browsing control unit, which circularly sends video and audio code streams of all conference sites in the conference to a conference terminal that requests participating in a remote video conference, and dynamically displays an image of each corresponding conference site video source in a sub-picture of a screen of the conference terminal, after receiving a request for participating in the remote video conference sent by the conference terminal; and
   a conference control unit, which performs an editing control operation on each conference site video or audio signal dynamically displayed in the sub-picture of the screen of the conference terminal, after receiving a conference site control request sent by the conference terminal.

15. An image-based video conference control system, comprising:
   a conference terminal, which receives a conference site remote control signal to be displayed on an image-based human machine interface (HMI), sends a control request message to a network-side device, and dynamically displays on the HMI of the local conference terminal, image information comprises one or more remote conference site providing multimedia content for video conference according to a control message fed back by the network-side device, so as to edit and set an image which represents a remote conference site to be selected for joining or not joining, to perform the image-based HMI video conference control; and
   a multi-point conference control apparatus, which utilizing the HMI on the local conference terminal, performs an editing control operation on a playing situation of a conference site video source corresponding to each conference terminal in a conference, after receiving a control request sent by the conference terminal,
   wherein the conference terminal and the multi-point conference control apparatus are connected through an Internet or a wireless communications network to transmit data.

16. A conference terminal, comprising:
   an image-based human machine interface (HMI);
   a sending module, which sends a control request message to a network-side device;
   a display module, which dynamically displays on the HMI of the local conference terminal, image information comprises one or more remote conference site providing multimedia content for video conference according to a control message fed back by the network-side device; and
   a control module, which utilizes the HMI on the local conference terminal to perform a video conference control operation on an image which represents a remote conference site to be selected for joining or not joining, according to the image information in order to complete the image-based HMI video conference control.

* * * * *